United States Patent [19]

Braun

[11] 3,972,387
[45] Aug. 3, 1976

[54] LUBRICATION SYSTEM WITH QUICK-CHANGE SUPPLY RESERVOIR

[75] Inventor: Fredrick J. Braun, Canonsburg, Pa.

[73] Assignee: Houdaille Industries, Inc., Buffalo, N.Y.

[22] Filed: Nov. 25, 1974

[21] Appl. No.: 526,802

[52] U.S. Cl............................ 184/28; 137/614.04; 141/352; 184/105 R; 184/105 B; 220/18; 222/325
[51] Int. Cl.².......................................... F16N 3/10
[58] Field of Search.............. 184/28, 45 R, 45 A, 184/6.14, 26, 27 R, 27 A, 27 C, 27 D, 32, 36, 48 R, 48 A, 53, 84, 86, 105 R, 105 A, 105 B, 105 C, 6.19, 6.28, 80; 222/325, 326, 327, 453; 141/375, 352; 220/18, 94 R, 327; 137/614.04

[56] References Cited
UNITED STATES PATENTS

| 497,896 | 5/1893 | Ruppel | 141/352 X |
|---|---|---|---|
| 1,345,571 | 6/1920 | Yates | 184/105 C UX |
| 1,638,377 | 8/1927 | Thorp | 184/48 R X |
| 1,697,314 | 1/1929 | Gresser | 184/105 B UX |
| 1,723,437 | 8/1929 | Owens | 184/105 R |
| 1,896,507 | 2/1933 | Battle | 184/28 |
| 2,258,637 | 10/1941 | Young et al. | 222/325 UX |
| 2,595,752 | 5/1952 | Batts | 220/18 X |

FOREIGN PATENTS OR APPLICATIONS

| 197,436 | 1923 | United Kingdom | 184/105 B |
| 535,616 | 4/1941 | United Kingdom | 184/105 B |

*Primary Examiner*—Richard C. Pinkham
*Assistant Examiner*—Arnold W. Kramer
*Attorney, Agent, or Firm*—Hill, Gross, Simpson, Van Santen, Steadman, Chiara & Simpson

[57] ABSTRACT

A reservoir-type pump structure for liquid and viscous materials, particularly lubricating materials such as lubricating oils and greases, in which the reservoir is formed as an independent unit readily detachable from the pump structure or attached thereto, whereby the pump may be readily supplied with lubricating materials by interchanging reservoirs, eliminating the need for refilling the reservoir at the location of use.

7 Claims, 3 Drawing Figures

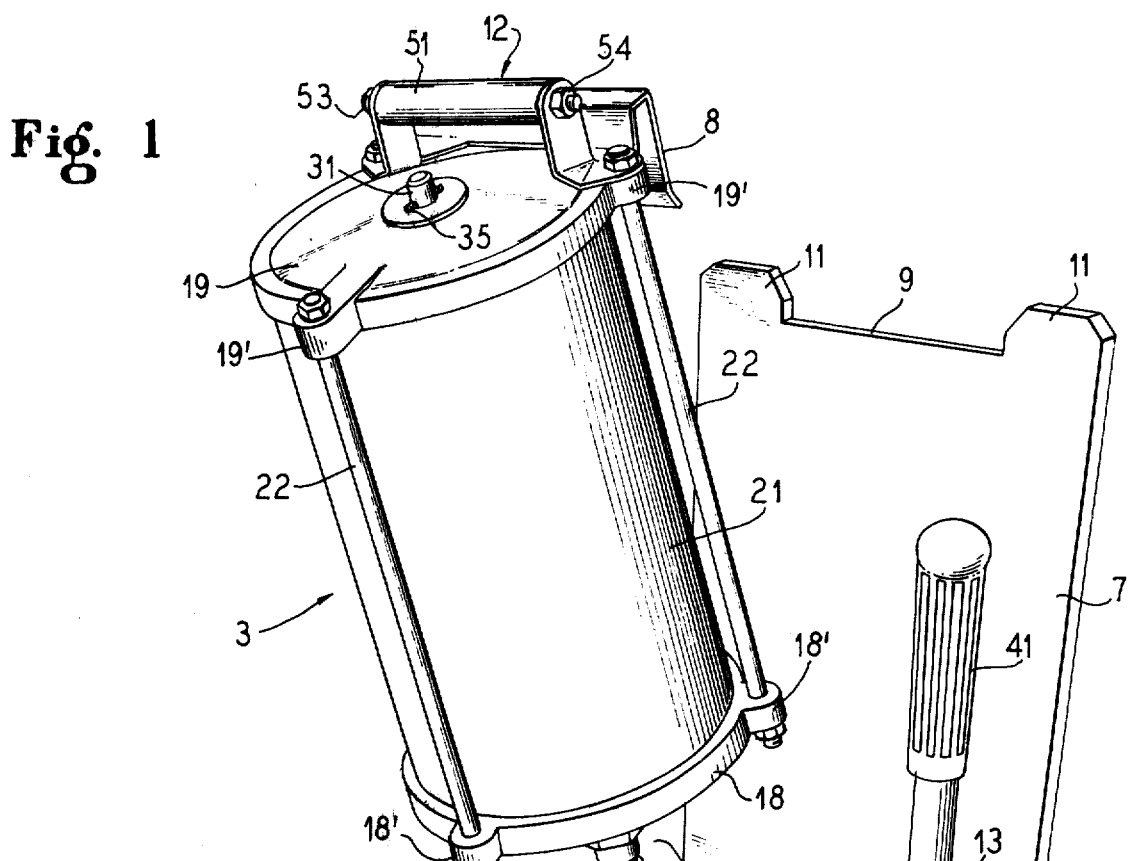
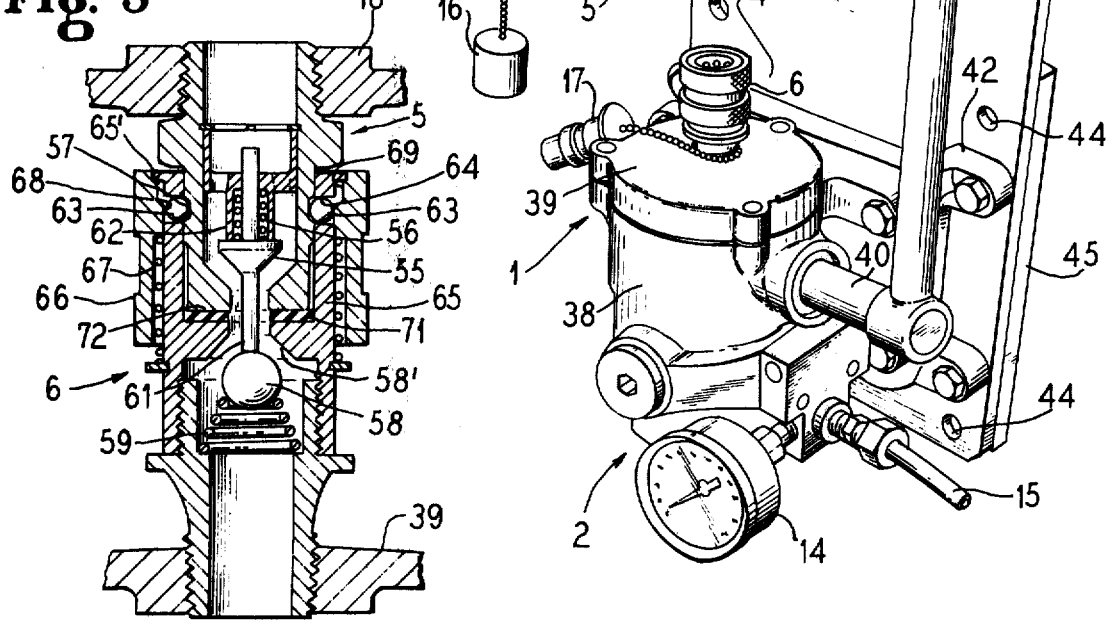

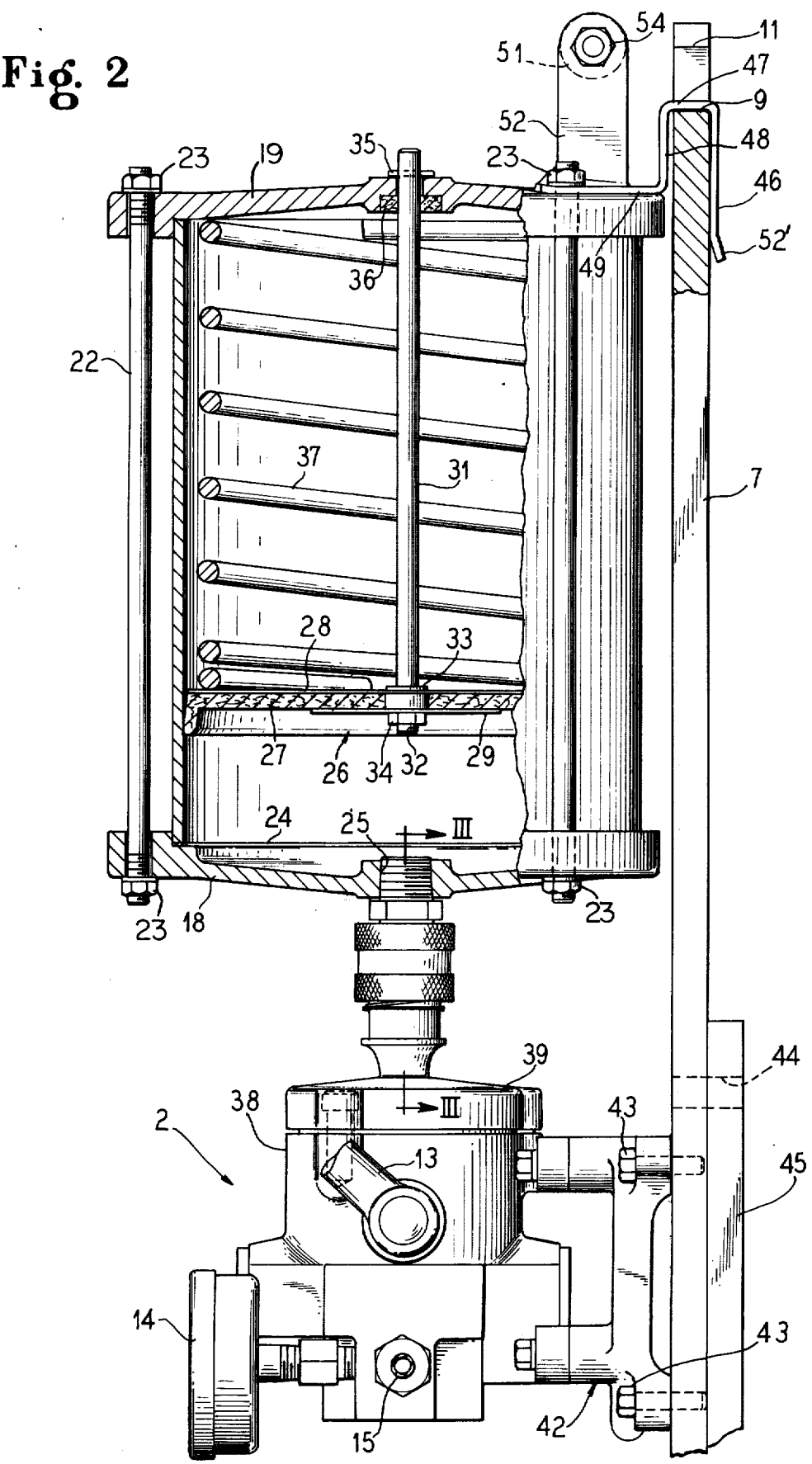

LUBRICATION SYSTEM WITH QUICK-CHANGE SUPPLY RESERVOIR

BACKGROUND OF THE INVENTION

The invention is directed generally to pump structures of the reservoir type, and more particularly to a novel reservoir construction in which a filled reservoir may be readily interchanged with an empty reservoir at the pump site.

Reservoir type pumps are extensively employed, particularly in connection with the lubrication of machinery and the like whereby such machinery may be periodically supplied with lubricant from the reservoir with the lubricant pump discharging lubricant at any suitable number of locations at which lubrication is required. By use of the reservoir a reasonable supply of lubricant may be provided at the pump with the reservoir being refilled periodically. As the invention has particular application to lubrication systems, it will be described in this context.

In lubricant reservoirs of the type referred to, the lubricant is supplied to the pump proper under pressure, as distinguished from a gravity feed, with the pressure normally being provided by an external separate pumping means, through which a coiled compression spring and piston within the reservoir is compressed in the filling. Heretofore, reservoirs of this type were a unitary part of the pump structure and provided with a suitable fill connection through which lubricant could be forced. It has been customary in connection with such filling operations to employ a relatively large supply of lubricant in a container, transport the container to the location of the pump, operatively connect the supply container with the reservoir by means of a suitable conduit and then suitably pump the lubricant into the reservoir in opposition to the pressure exerted by the piston and spring.

The use of a piston and spring in a reservoir, of the type here involved, to preload the contents supplied, prevents the possibility of readily filling the reservoir by removing a cover and discharging the material directly into the reservoir. As a matter of fact, extreme care must be taken with respect to reservoirs of this type as the spring pressures may be over 200 pounds per square inch and the opening of a reservoir of this type for filling purposes would create considerable problems with respect to the control of the spring involved. For example, if the cover of the reservoir could be removed, upon loosening the same, the spring pressure would propel the cover therefrom with possible injury to personnel. Irrespective thereof, obviously if the reservoir were filled with a liquid or viscous material it would be exceedingly difficult to place the piston in proper position and then compress the spring to enable the cover to be secured to the reservoir.

To eliminate possible injury to personnel when the reservoir is being taken apart, it is customary to provide some form of connection between the piston and the cover member of the reservoir against which the opposite end of the piston bears whereby the compression spring is always preloaded and cannot freely expand. Such restriction may be of various types, for example a rod rigidly secured to the piston and extending through an opening in the reservoir cover with the free end of the rod provided with a suitable abutment preventing separation between it and the cover. In other constructions, the connecting member between piston and cover may, for example, be of chain-like formation, thereby eliminating rod movement exteriorly of the cover. In view of this type construction, it is usually customary to provide a supply port or fitting which may be normally closed suitably and protected by a plug or cover member which is removed to accommodate reception of the supply conduit previously referred to, which for example may be threaded into or otherwise secured to such a supply port. The lubricant may then be supplied under pressure, sufficiently great to effect a compression of the coiled compression spring within the reservoir.

Supply operations of this type have two principal disadvantages, the first being that normally a series of pumps are to be filled and the supply container thus is relatively large and bulky and second the in situ refilling of the pump reservoirs presents a problem with respect to cleanliness. In the operation of large machinery and equipment requiring extensive lubrication, it is substantially essential that clean, uncontaminated lubricant be supplied as foreign matter in the lubricant might result in damage to the machinery.

Many pieces of machinery falling into the general type heretofore referred to are employed in locations which render refilling of a reservoir particularly difficult with respect to cleanliness. One typical example is in coal mines with respect to mining machinery and the like. Numerous other types of machinery involve the same general problem, for example in steel mills, etc.

The problem is a serious one and many companies have gone to great lengths in an effort to avoid improper lubrication. For example, many companies have built so-called "clean rooms" in which lubricant is filled in the supply containers from which the reservoirs are subsequently filled. However, obviously this measure solves merely a part of the problem, as it does not insure the ultimate receipt of clean lubricant into the pump reservoir, merely that the supply will be clean at the time it reaches the pump location. The problem therefore still existed of insuring that the new supply of material reaching the pump would be completely uncontaminated.

BRIEF SUMMARY OF THE INVENTION

This problem is solved in the present invention by eliminating the refilling of the reservoir at the pump location and instead so constructing the reservoir and the pump that the entire reservoir, when empty, may be quickly detached from the pump structure and a new, fully loaded reservoir substituted therefor. In this case, the supplying personnel need not transport a relatively large container, pump equipment, conduit means, etc., to the pump location, but merely the reservoir, per se, and by a simple operation removing the empty reservoir and interchanging it with a filled reservoir. This can be done very quickly and easily and with substantially no possibility of contamination taking place during the interchange. The new filled reservoir can be provided with means for sealing the coupling structure, to be connected to the pump, so that contamination of such coupling structure cannot take place during transport to the pump location, and at the same time every precaution can be observed in the filling of the independent reservoirs, as such operation can take place in a clean room or the like where maximum protection can be maintained. The contruction of the connections between the reservoirs and pump structure can be similar to quick-change couplings employed, for example, on airlines and the like in which both parts of the coupling automatically seal their inlet or outlet ports when the coupling members are detached from one another.

In addition, the reservoir and permanent pump structure may be so constructed that the reservoir is adequately supported in proper operative position relative to the pump structure and at the same time readily detachable therefrom when desired.

BRIEF DESCRIPTION OF THE DRAWINGS

In the drawings wherein like reference characters indicate like or corresponding parts:

FIG. 1 is a perspective view of a pump and reservoir structure embodying the present invention with the reservoir detached from the pump structure;

FIG. 2 is a side elevational view of a pump and reservoir structure, in assembled relation, such illustrated in FIG. 1, with portions broken away to show details of the reservoir structure; and FIG. 3 is a sectional view, taken approximately on the line III—III of FIG. 2, of the coupling structure.

DETAILED DESCRIPTION OF THE INVENTION

General

Referring to the drawings and in particularly FIG. 1, the reference numeral 1 indicates generally a reservoir type pump structure having a pump structure indicated generally by the numeral 2 adapted to be rigidly affixed to, for example, a wall structure or the like, and a detachable supply reservoir, indicated generally by the reference numeral 3 for the material to be supplied to the pump 2. As previously mentioned, the invention is particularly applicable to reservoir-type pumps such as those employed in the lubrication field for supplying oil or grease to a piece of machinery, the pump illustrated being of the manually actuated type and periodically manually actuated to insure a constant supply of lubrication at the various lubrication points on the machinery which will be suitably connected by tubing or the like to the pump 2.

The reservoir 3 is adapted to be operatively connected to the pump 2 by means of a coupling 4, illustrated as comprising a male coupling element 5 carried by the reservoir 3 and a female coupling element 6 carried by the pump 2. The reservoir is adapted to be suitably supported, by means, independent of the coupling 4, which in the embodiment of the invention illustrated comprises a vertically extending backplate 7 rigidly associated with the pump 2 and a cooperable mounting member 8 carried by the reservoir 3 and adapted to overlie the upper edge portion 9 of the backplate 7, whereby the weight of the reservoir will be carried by the backplate and by the member 8. The top edge 9 of the backplate, in the construction illustrated, has a length slightly larger than the corresponding length of the member 8, whereby the upwardly extending projections 11 form retaining abutments for the member 8 preventing lateral movement of the member on the backplate 7, and thus prevents movement of the reservoirs relative to the pump 2. The reservoir may be provided with suitable handle means 12 for convenient handling and transporting of the reservoir as well as facilitating the mounting of the reservoir on the backplates 7, and detachment thereof.

The mechanism of the pump 2 may be of standard commercial construction, the details of which form no part of the present invention, and may be manually or power actuated. The pump illustrated is adapted to be manually actuated by a handle member 13 and may be provided, for example, with a pressure guage 14 by means of which the pressure in the discharge line 15 to the desired lubricating point may be determined.

As hereinafter described in great detail, the coupling 4 is of the quick change type, i.e., the members thereof may be readily separated without requiring tools etc. and the male fitting 5 may be provided with a protective cap 16 and the female member 6 provided with a protective plug 17, for use when the couplings are to remain unconnected for any length of time beyond that required for reservoir changeover.

The reservoir 3 preferably is of the preloaded or pressure-feed type, in which the contents are suitably placed under pressure to provide a pressure-feed to the pump 2 when the reservoir is in operative position. In view of the pressurizing of the reservoir 3, the male coupling member 5 is of the self-sealing type whereby the contents of a filled reservoir will not be discharged from the coupling member 5 until the latter has been properly interlocked with the coupling member 6, and in like manner the member 6 may be provided with a similar valve member whereby both of the coupling members will be sealed when separated, but will provide operative communication between the reservoir and the pump when the coupling members are properly interlocked.

Detailed Description of the Reservoir

Referring to FIG. 2, the reservoir 3 comprises a base member 18, a top or cover member 19, and a cylindrical tubular side wall member 21, the latter being clamped between the top and bottom members by a plurality of rods 22 having threaded end portions extending through projections 18' and 19' in the respective members 18 and 19 and secured in place by nuts 23 with the bottom member 18 and adjacent end edge of the tubular member 21 being effectively sealed by an annular gasket member 24. The bottom member 18 is provided with a central bore 25 in which is threaded the coupling member 5.

Disposed within the reservoir chamber so formed is a reciprocable piston member or plunger, indicated generally by the numeral 26, comprising a resilient body member 27 disposed between a backing plate 28 and cooperable plate 29 at the opposite face of the member 27, with the assembly being secured to the adjacent end of a centrally disposed rod 31, the latter having a threaded end portion 32 extending through the piston assembly and having a shoulder or flange 33, against which the adjacent face of the assembly abuts, with the assembly being secured in rigid association therewith by a nut 34. The opposite end of the rod 31 extends through the cap member 19, with inward movement of the end of the rod being prevented by suitable means such as a pin 35 extending through the rod 31. A suitable soft sealing ring or washer 36 may be provided in the cap member 19 which bears on the rod 31 and functions to prevent any contaminating material on the rod from entering the reservoir structure. However, the member 36 may also function as a filter for air entering the chamber adjacent the rod, as the piston is reciprocated. The piston is urged into its lowermost position, illustrated in FIG. 2, by means of a coiled compression spring 37, the upper end of which bears on the cover member 19 and the lower end on the backing plate 28 of the piston structure.

The spring 37 may be preloaded, to insure a desired pressure on lubricant within the reservoir, which for example, may be serveral hundred pounds per square inch or more, and the rod 31 and pin 35 thus prevent free expansion of the spring if the reservoir is disassembled, in the absence of which the spring might propel the cap member 19 and piston in separating directions with sufficient force to possibly cause injury to personnel handling the same. It will be appreciated that a chain or other suitable structure may be substituted for the rod 31 for restricting the separating movements of the parts, but as extent of projection of the upper end of the rod from the cap 19 will be an indication of the quantity of lubricant remaining in the reservoir, such rod structure will preferably be employed where such an indication is desired. Existing commercial reservoir units utilizing the chain-type structure can provide level indication through employment of a transparent cylindrical tubular side member.

The Pump Structure

The pump structure 2 is of generally standard construction, of a type similar to those employed with integrally connected reservoirs, currently on the market, with the exception that the pump housing or base 38 is provided with a cover or cap member 39 in which is threaded the female coupling member 6. The handle 13 is rigidly connected to a partially rotatable shaft 40 which is operatively connected to the piston structure, or its equivalent, of the pump whereby the pump may be actuated by grasping the gripping member 41 of the handle 13 and rotating the handle away from the backplate 7, to impart rotary motion to the shaft 40 in a counterclockwise direction as viewed in FIG. 1.

Reservoir Coupling and Supporting Structures

The pump housing 38 is provided with a mounting structure indicated generally by the reference numeral 42 which is suitably attached, as for example by bolts 43 to the backplate 7 with the entire assembly being rigidly mounted on a stationary structure, as for example a wall or the like. Such mounting, for example, may be by means of bolts or other elements passing through holes 44 (only three of which are illustrated in FIG. 1). If the supporting structure, for example a wall, extends continuously up above the top of the backplate 7, the latter may be spaced from such wall by suitable means, for example a spacing member 45 having openings therein aligned with the openings 44 for the reception of mounting bolts or the like, thereby providing adequate space for the mounting member 8. The latter, as illustrated in FIG. 2, may be constructed of sheet metal or the like and is provided with a rear wall 46, a top wall 47 and a front wall 48 which is provided with lugs or ears 49 adapted to receive the adjacent ends of the respective rods 22. In a like manner, the handle member 12 comprises a cylindrical hand gripping portion 51 which is supported from the cover member 19 by vertically extending side members 52 integrally formed with and connected to the ears 49 whereby such rods secure both the member 8 and the handle member 12 to the reservoir. The hand gripping portion 51 of the handle 12 is secured to the members 52 by a threaded bolt 53 extending through the hand gripping member 51 and the members 52 and a cooperable nut 54.

The free edge of the rear wall 46 of the clip 8 may be provided with an outwardly diverging edge portion 52' facilitating engagement of the clip member with the backplate 7. Thus, the reservoir may readily be mounted, by means of the member 8, on the backplate 7 and supported from the edge 9 thereof.

The coupling structure 4 may be of any suitably constructed couplers of this general type being on the market with FIG. 2 illustrating a typical type of structure. Thus, the coupling element 5 may be provided with a movable closure member 55 which is biased by a spring 56 into normally closed relation when the coupling member 5 is not engaged with the coupling member 6. The member 5 is also provided with a circumferentially extending groove 57 therein for cooperation with cooperable means on the coupling member 6.

The coupling member 6 is likewise provided with a valve member 58 in the form of a ball adapted to be urged into sealing engagement with a valve seat 58' by means of a compression spring 59 whereby the ball 58 will seal the coupling member 6 when the coupling member 5 is not engaged therewith. The valve member 55 is provided with an elongated stem or projection 61 of a length to engage the ball 58 and move the same to an open position when the coupling members are engaged as illustrated, in which position the valve member 55 is engaged with the stationary portion 62 of the member 5.

The coupling member 5 is adapted to be rigidly locked in position in the coupling member 6 by suitable means as for example a plurality of balls 63 carried in cooperable machine slots 64 in the body member 65 of the coupling 6 which may be releasably retained in the groove 57 of the coupling member 5 by a slide member 66 which is biased in an upward direction by a coil spring 67 and provided with an annular shoulder 68 which is engageable with the balls 63 when the sleeve member is in its upper position, thereby rigidly locking the two coupling members together. However, by sliding the member 66 downwardly, as viewed in FIG. 3 the larger internal diameter 69 of the sleeve will be disposed opposite the balls 63, permitting the balls to move laterally outward out of the groove 57 and release the coupling member 5. To insure a good seal between the two coupling elements a suitable sealing member 71 may be disposed between the free end of the coupling element 6 and adjacent face 72 of the coupling element. Likewise, outward movement of the sleeve 66 may be suitably restricted, as for example, by means of a flange 65' carried by the member 65.

Operation

It will be appreciated that with the present invention it is unnecessary to attempt to reload a reservoir structure at the location of the pump 2. Consequently reservoirs may be loaded at a location at which the danger of contamination of lubricants is reduced to a minimum, for example in a clean room specifically designed and constructed for performing operations of this type. As previously mentioned, many large companies provide such rooms in an effort to prevent lubricant contamination. While it may be desirable in at least certain instances to clean the reservoir before reloading, where not necessary, the reservoirs may be readily reloaded merely be inserting the male coupling member 5 in a cooperable female coupling member associated with a supply pump adapted to supply lubricant to the reservoir. Upon removal of the coupling member 5 from its mating member, the coupling member 5 will seal the contents of the reservoir until use. The free end of the coupling members may be readily kept clean by applying the respective protective cap or plug thereto, neither of which are operable to actuate the associated coupling member into "open" position. It will be appreciated that where practical or desirable, a supply of reservoirs may be loaded and then utilized on demand.

Assuming that a filled reservoir is to be substituted for an empty reservoir, the filled reservoir is suitably transported to the pump structure. The empty reservoir is grasped by the handle 12, and the sleeve 66 of the female coupling member 6 actuated to release the coupling member 5 therefrom, following which the reservoir may easily be lifted upwardly by means of the handle 12 until the member 8 is detached from the backplate 7, simultaneously separating the two coupling members and permitting the empty reservoir to be removed. The new reservoir may then be positioned above the pump structure with the mounting member 8 disposed in alignment with the top edge of the backplate 7 and the coupling member 5 in alignment with the coupling member 6. The reservoir is then moved downwardly to engage the member 8 with the upper edge of the backplate 7, simultaneously holding the sleeve 66 down until the coupling member 5 is in cooperable relation with the coupling member 6, which will take place as the member 8 seats on the edge 9 of the backplate. The sleeve 66 is then released and, upon assuming its upper position, securely locks the coupling member 5 in the coupling member 6.

If, for any reason, the pump 2 is to remain for a period without an associated reservoir, the protective plug 17 may be inserted in the coupling member 6, effectively protecting the inlet opening of the coupling member from the exterior.

It will be appreciated from the above description that the present invention substantially completely eliminates any possibility of lubricant contamination, assuming that the reservoirs are filled in a clean room or the like whereby contamination does not take place during the filling of the reservoir, as both of the coupling member 5 and 6 may be operatively maintained in clean condition throughout any period in which the respective coupling members are not engaged and only the relatively very small areas of the interengaging portions of the coupling member need be in such clean condition to substantially eliminate the possibility of lubricant contamination.

The present invention thus opens up an entirely new concept with respect to lubricant contamination and the supply of lubricant to remotely located pump mechanisms, and completely eliminates the necessity of reloading reservoirs in situ.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In a reservoir-type pump structure for liquid and viscous materials, particularly lubricating materials such as lubricating oils and greases, the combination of a pump structure having an inlet port, and an outlet port at which material may be discharged, a removable supply reservoir adapted to contain, under pressure, material to be pumped, said reservoir comprising a container providing a chamber closed at both ends, a piston reciprocably movable in said chamber, means for applying force to said piston continuously urging the latter toward one end portion of the chamber to provide a predetermined pressure preloading of material contained therein, such end portion having a material discharge port therein, and a spring-urged slidable locking sleeve coupling of the self-sealing, quick-change type comprising a pair of cooperable mating coupling members each including valve means, which valve means respectively unseat each other when mated and seat themselves when separated from one another, one of said coupling members being operatively connected to the pump structure at said inlet port, said valve means thereof forming a closure member therefor when separated from its mating member, and the other coupling member being connected to the supply reservoir at said discharge port, said valve means thereof forming a closure member therefor when separated from its mating member, said coupling members, when mated, operatively unseating said valve means and directly connecting said reservoir with said pump structure, whereby material at said predetermined pressure may be supplied thereto.

2. A pump structure according to claim 1, wherein said pressure-applying means comprises a compression spring operatively engaged with said piston for applying pressure thereto.

3. A pump structure according to claim 2, wherein said spring is operable to provide a relatively low pressure preloading of material within said chamber and said pump is constructed to discharge material therefrom at a higher pressure than said preloading pressure.

4. A pump structure according to claim 1, comprising in further combination, a fixed member which is rigidly related to said pump structure, and means on said reservoir detachably engageable with means on said fixed member for providing primary support to said reservoir.

5. A pump structure according to claim 4, wherein said support means comprises a member adapted to overlie an upwardly facing edge of said fixed member, and provided with a downwardly depending portion disposed behind a portion of said fixed member for restricting separating movement therebetween.

6. A pump structure according to claim 1, comprising a handle member carried by said reservoir for use in transport of the latter and facilitating mounting and demounting of the same on said pump structure.

7. A pump structure according to claim 1, wherein said coupling members comprise a male coupling member on said reservoir and a female coupling member on said pump structure, comprising in further combination, a protective cap member for said male coupling member which may be applied to the free end of the latter when separated, and a protective plug member for said female coupling member which may be inserted in the latter.

* * * * *